United States Patent
Lang et al.

(10) Patent No.: US 6,769,351 B2
(45) Date of Patent: Aug. 3, 2004

(54) RADIAL PISTON PUMP

(75) Inventors: Johannes Lang, Oberreichenbach (DE); Stefan Willared, Erlangen (DE); Klaus Scharinger, Gauchsdorf (DE)

(73) Assignee: INA-Schaeffler KG (DE)

(*) Notice: Subject to any disclaimer, the term of this patent is extended or adjusted under 35 U.S.C. 154(b) by 68 days.

(21) Appl. No.: 10/298,041

(22) Filed: Nov. 15, 2002

(65) Prior Publication Data

US 2003/0110937 A1 Jun. 19, 2003

(30) Foreign Application Priority Data

Nov. 29, 2001 (DE) .......................................... 101 58 768

(51) Int. Cl.$^7$ .................................................. F04B 1/04
(52) U.S. Cl. .......................................... 92/72; 384/569
(58) Field of Search .............................. 92/72; 384/564, 384/569, 477; 417/273; 91/491

(56) References Cited

U.S. PATENT DOCUMENTS 5,785,430 A * 7/1998 Bright et al. ............... 384/569
5,897,215 A * 4/1999 Mirring ..................... 384/564
6,003,430 A * 12/1999 Lang ............................ 92/72
6,202,538 B1 * 3/2001 Scharinger et al. ............ 92/72
6,431,986 B2 * 8/2002 Olszewski .................. 384/564

FOREIGN PATENT DOCUMENTS

| DE | 4407310 | 9/1995 |
| DE | 19839430 | 3/2000 |
| DE | 19858996 | 6/2000 |

* cited by examiner

Primary Examiner—Thomas E. Lazo
(74) Attorney, Agent, or Firm—Muserlian, Lucas and Mercanti

(57) ABSTRACT

In an eccentric bearing arrangement for a pump shaft (2) comprising an eccentric ring (4) that is fixedly attached thereto, and further comprising a needle roller bearing that is arranged on an outer peripheral surface of the eccentric ring, a stop washer (12) is retained in a circumferential groove (13) of the needle roller bushing (9) and is surrounded radially by the adjoining flange (11) of the needle roller bushing (9), and the stop washer (12) comprises an axially inward open annular groove (15) in which the cage (6) is guided.

10 Claims, 4 Drawing Sheets

RADIAL PISTON PUMP

FIELD OF THE INVENTION

The invention concerns a radial piston pump comprising a rotating pump shaft having a portion that is fixedly attached to an eccentric ring, a needle roller bearing being arranged on an outer peripheral surface of the eccentric ring said needle roller bearing comprising a needle roller bushing having two radially inward directed flanges between which needle rollers that are guided in a cage roll, an outer raceway for the needle rollers being formed by an inner peripheral surface of the needle roller bushing and an inner raceway for the needle rollers being formed by the outer peripheral surface of the eccentric ring a stop washer being arranged on one side between one of the flanges of the needle roller bushing and the eccentric ring, said stop washer overlapping the eccentric ring radially, so that an inseparable assembly is formed, and at least one pump plunger that is arranged in a pump housing and extends radially to the pump shaft being supported through an end face on the needle roller bushing The invention further concerns a radial piston pump comprising a rotating pump shaft having a portion that is fixedly attached to an eccentric ling, a needle roller bearing being arranged on an outer peripheral surface of the eccentric ring, said needle roller bearing comprising a needle roller bushing having two radially inward directed flanges between which needle rollers that are guided in a cage roll, so that an inseparable assembly is formed, an outer raceway for the needle rollers being formed by an inner peripheral surface of the needle roller bushing and an inner raceway for the needle rollers being formed by the outer peripheral surface of the eccentric ring.

BACKGROUND OF THE INVENTION

A generic eccentric bearing arrangement of the pre-dated type for a reciprocating piston pump is known from the document DE 198 39 430 A1. As can be seen in FIG. 1 of this document, the eccentric bearing arrangement comprises a drive shaft having a shaft journal on which the eccentric bearing is arranged. The eccentric bearing comprises a needle roller bushing which surrounds the eccentric ring with it two radially inward directed flanges. This is effected on one side through an additional stop washer that is arranged between the eccentric ring and one of the flanges. The needle rollers that are guided in a cage roll in axial direction between the flange of the needle roller bushing and the stop washer, the two raceways for the needle rollers being formed by the inner peripheral surface of the needle roller bushing and the outer peripheral surface of the eccentric ring. A pump plunger mounted for longitudinal displacement in a housing contacts the outer peripheral surface of the needle roller bushing through an end face.

A drawback of this prior art is that the eccentric bearing is susceptible to dust pollution particularly when undergoing high rotary speeds.

OBJECTS OF THE INVENTION

It is an object of the invention to provide an improved eccentric arrangement for a radial piston pump.

This and other objects and advantages of the invention will become obvious from the following detailed description.

SUMMARY OF THE INVENTION

In a first solution, the invention achieves the above objects by the fact that the stop washer is retained in a circumferential groove of the needle roller bushing arid is surrounded radially by an adjacent one of the flanges of the needle roller bushing, and said stop washer comprises an axially inward open annular groove in which the cage is guided.

The inventive configuration of the eccentric bearing arrangement enables a substantially improved sealing action against dust and dirt particles because due to their relative positions, the eccentric ring, the stop washer and the bearing cage act as a labyrinth seal that prevents the entry of dust and dirt particles into the interior of the bearing. Due to this improved sealing action, the operative life of such a bearing is substantially enhanced.

According to one proposition of the invention, the stop washer may be arranged for free rotation or be firmly fixed in the needle roller bushing According to another proposition of the invention, the flange of the needle roller bushing situated opposite the stop washer comprises an axially inward open annular groove in which the cage is guided. Due to this configuration, the sealing action of the bearing on the side concerned is likewise improved due to the formation of a labyrinth.

According to still another proposition of the invention, as viewed in a longitudinal section, the cage has a reduced radial thickness in the region of the annular grooves. This reduced radial thickness creates in the annular groove of the stop washer and the flange, an enlarged empty space that can be utilized for grease storage.

In a second solution, the invention achieves the above objects by the fact that each of the two ends of the eccentric ring comprises a stepped recess into which the stop washer and an opposite one of the flanges of the needle roller bushing engage. In this case, too, due to the inventive configuration and relative positions of the eccentric ring, the bearing cage and the stop washer, a labyrinth seal is formed that creates a substantially improved protection of the bearing from dirt particles.

In a third solution, the invention achieves the above objects by the fact that the stop washer is retained in a circumferential groove of the needle roller bushing and is surrounded radially by an adjacent one of the flanges of the needle roller bushing, a sliding seal being arranged between the cage and the stop washer and between the cage and an opposing one of the flanges.

In a fourth solution, the invention achieves the above objects by the fact that the stop washer is retained in a circumferential groove of the needle roller bushing and surrounded radially by an adjacent one of the flanges of the needle roller bushing, which flange engages through an axial extension into an axially outward open annular groove of the stop washer, and that end of the eccentric ring that is situated opposite the stop washer comprises an axially outward open annular groove into which an axial extension of the other of the two flanges engages.

In a fifth solution, the invention achieves the above objects by the fact that, adjoining the inner raceway for the needle rollers the eccentric ring comprises on each of its two ends, a radially outward directed extension, and each extension is surrounded by one of the flanges of the needle roller bushing. In this case to, due to the formation of a labyrinth by the extensions of the eccentric ring and the two flanges of the needle roller blushing, an efficient seal is created.

Finally, in a sixth solution, the invention achieves the above objects by the fact that, adjoining the inner raceway for the needle rollers, the eccentric ring comprises on one end, a radially outward directed extension that is surrounded by one of the flanges of the needle roller bushing, while on an opposite end, the eccentric ring comprises a stepped recess into which the other of the flanges of the needle roller bushing engages.

The invention will now be described more closely with reference to the following examples of embodiment and the appended drawings.

DETAILED DESCRIPTION OF THE DRAWING

Figure 1:
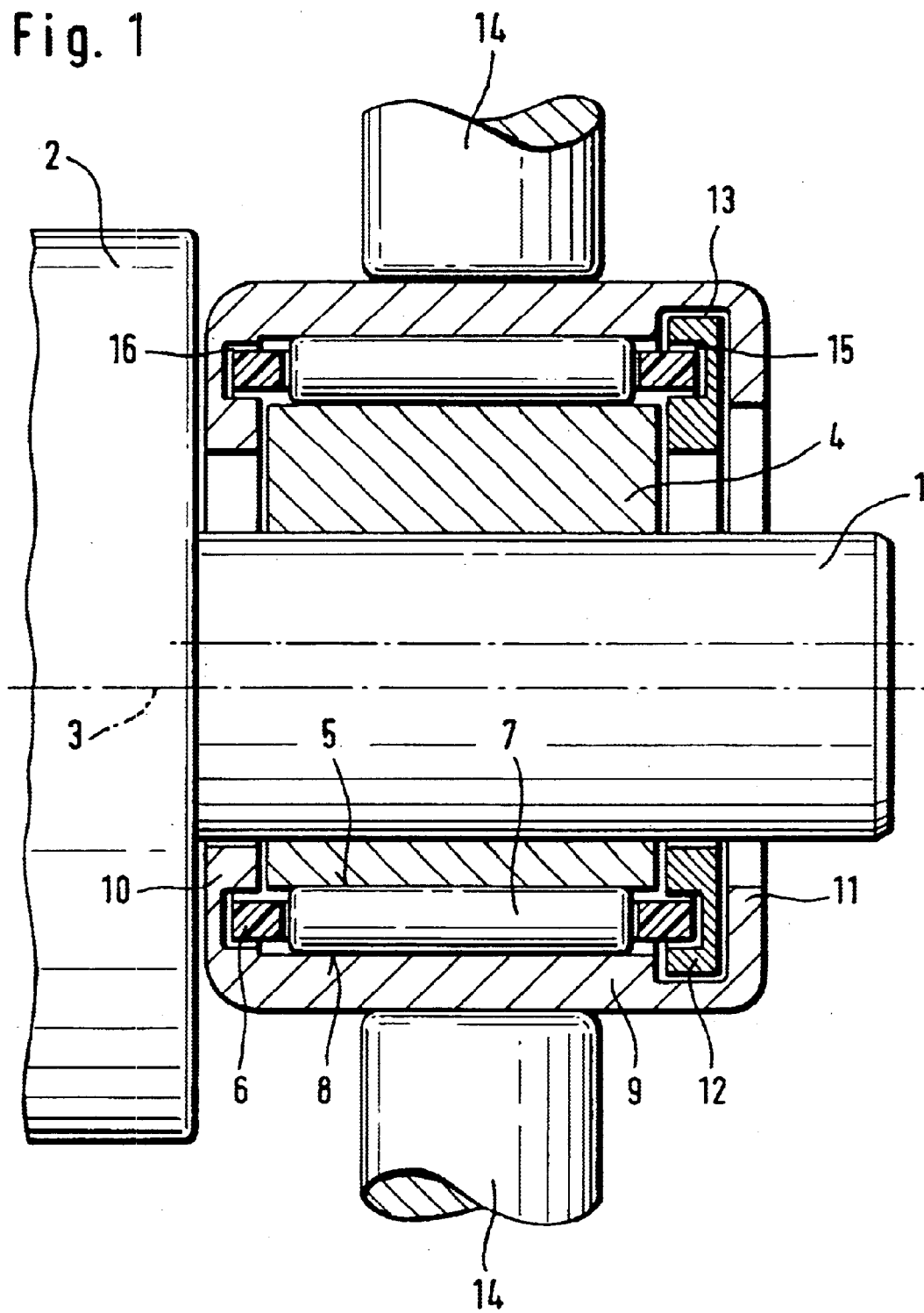
FIG. 1 Shows an eccentric bearing of the invention arranged on a pump shaft.

FIG. 1 shows the novel eccentric arrangement of a radial piston pump in which the pump shaft 2 comprising an end portion 1 is arranged for rotation about its longitudinal axis 3. An eccentric ring 4 is retained on the end portion 1 of the pump shaft 2 by forced or, positive engagement, and the outer peripheral surface of the eccentric ring 4 forms the inner raceway 5 for needle rollers 7 that are guided in a cage 6. The associated outer raceway 8 is formed by the needle roller bushing 9 that comprises a radially inward directed flange 10, 11 on each end. The left-hand flange 10 has a radial dimension such that it overlaps a part of an end face of the eccentric ring 4. Disposed in the right-hand empty space between the eccentric ring 4 and the flange 11 is a stop washer 12 which is arranged with its outer peripheral surface in a circumferential groove 13 of the needle roller bushing 9. The stop washer 12 that may be arranged for free rotation or be firmly fixed in the groove 13 has a radial dimension such that it overlaps a part of an end face of the eccentric ring 4. The stop washer 12 is retained by the inward directed flange 11 of the needle roller bushing 9. In this way, a compact, inseparable assembly with a small overall axial dimension is formed that, upon rotation of the pump shaft 2, causes a reciprocating motion of the pump plunger 14 that is in contact with the outer peripheral surface of the needle roller bushing 9.

As shown further in FIG. 1, both the stop washer 12 and the flange 10 of the needle roller bushing 9 comprise an axially inward open annular groove 15 and 16 respectively, in which the bearing cage 6 is guided. Due to the inventive arrangement of the eccentric ring 4, the cage 6 and the stop washer 12 as also of the flanges 10, 11 with their grooves 15 and 16, a labyrinth seal is formed that impedes the penetration of dirt particles into the interior of the bearing. It can also be seen in FIG. 1 that a penetration of dirt particles is only possible, at best, through the small axial gap between the stop washer 12 and the opposing end of the eccentric ring 4 and between the flange 10 and the opposing end of the eccentric ring 4. However, these dirt particles only reach the bearing cage 6 and cannot penetrate further into the region of the outer raceway 8.

Figure 2:
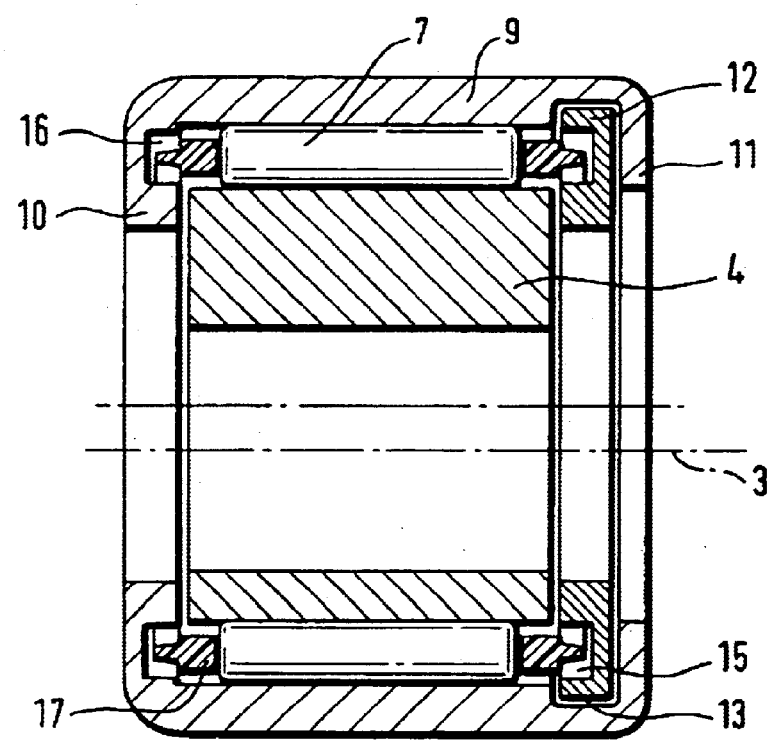
FIG. 2 Shows another embodiment of the eccentric bearing of the invention.

The structure of the eccentric bearing shown in FIG. 2 is similar to that of the eccentric bearing of FIG. 1 with the exception that the cage 17 differs from the cage 6 of FIG. 1 in that it has a reduced cross-section in the region of the annular grooves 15 and 16. This results in the formation of an additional reservoir that can be advantageously used as a lubricant reservoir.

Figure 3:
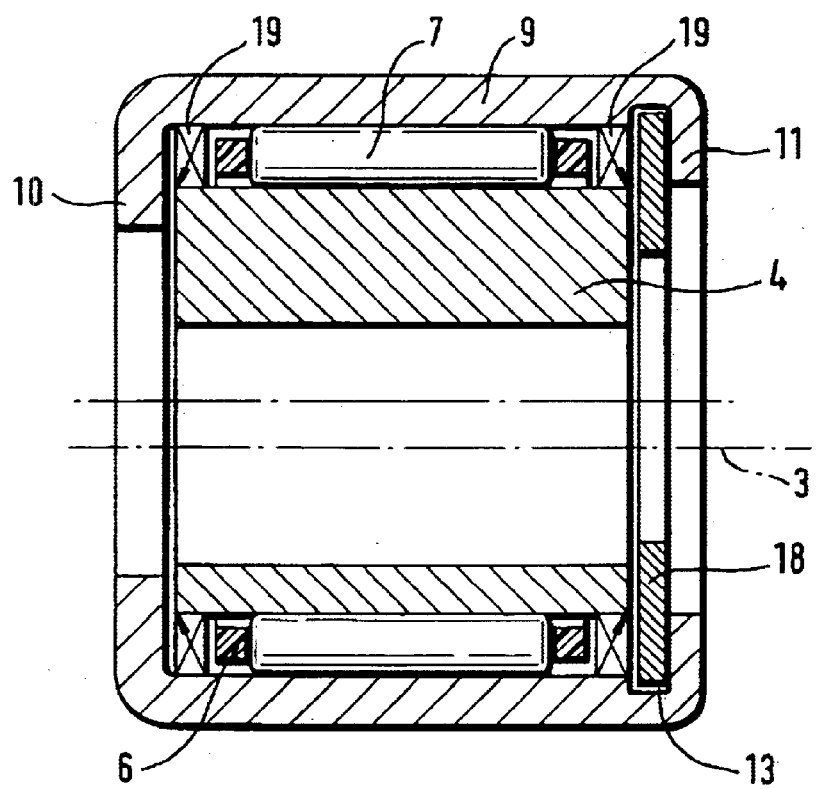
FIG. 3 shows still another embodiment of the eccentric bearing of the invention.

The eccentric bearing arrangement shown in FIG. 3 comprises a stop washer 18 that, again, is disposed in the circumferential groove 13 of the needle roller bushing 9 and is mounted either for free rotation or is firmly fixed therein. According to the invention, a sliding seal 19 is arranged between the stop washer 18 and the cage 6 as also between the flange 10 of the needle roller bushing 9 and the cage 6 and seals the bearing fully both in inward and in outward direction.

Figure 4:
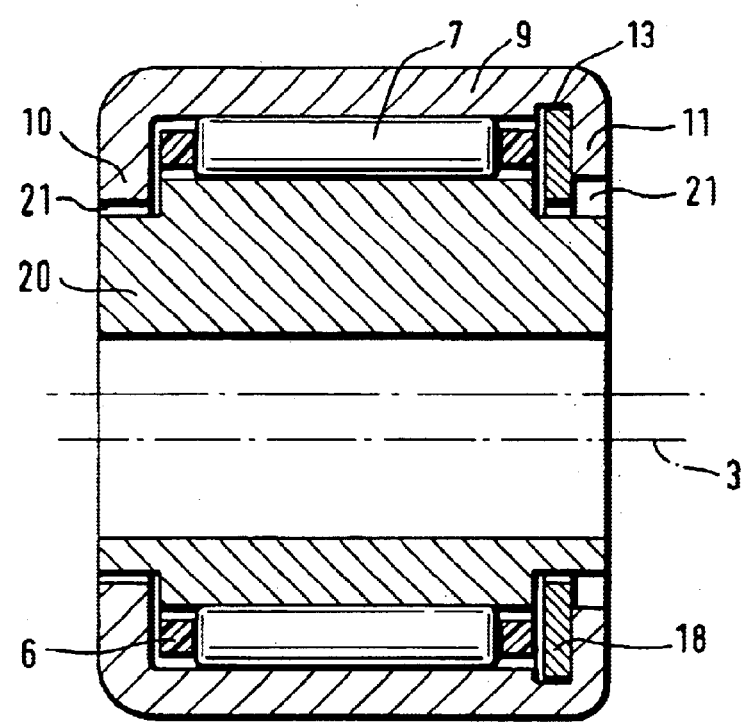
FIG. 4 shows still another embodiment of the eccentric bearing of the invention.

The bearing arrangement of FIG. 4 is distinguished by the fact that the eccentric ring 20 comprises a stepped recess 21 in its outer peripheral surface on each of its two opposite ends, into which recesses 21, the stop washer 18 and the flange 10 of the needle roller bushing 9 engage respectively. In this embodiment, too, an improved sealing action is obtained by the formation of a labyrinth between the stop washer 18 and the eccentric ring 20 and between the flange 10 and the eccentric ring 20.

Figure 5:
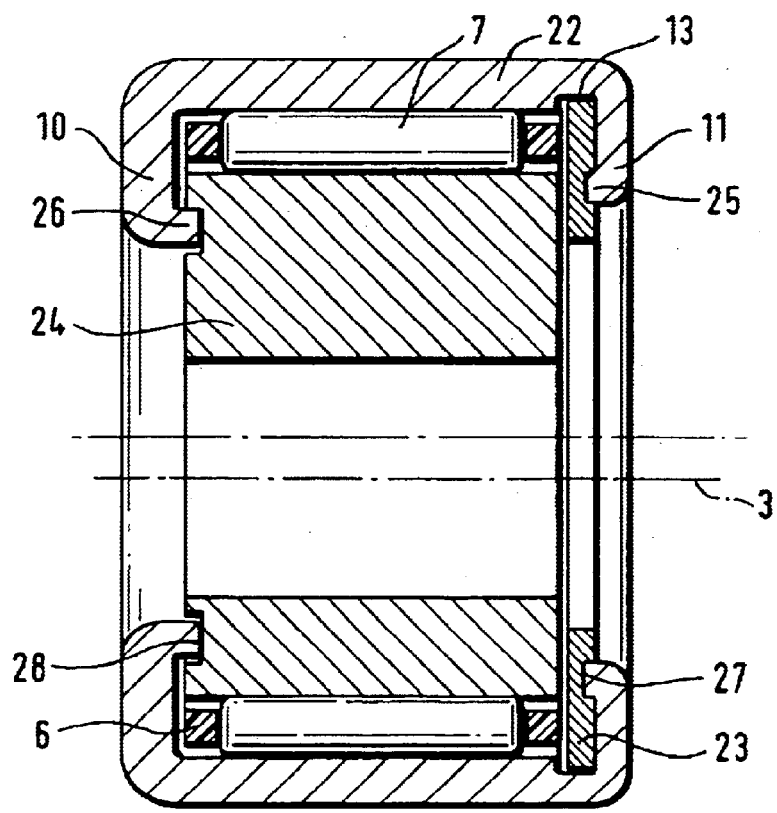
FIG. 5 shows still another embodiment of the eccentric bearing of the invention.

FIG. 5 shows the needle roller bushing 22 in whose circumferential groove 13 the stop washer 23 comprising the axially outward open annular groove 27 is arranged. An axial extension 25 of the flange 11 of the needle roller bushing 22 engages into this annular groove 27. On the opposite end the eccentric ring 24 comprises an axially outward open annular groove 28 into which the axial extension 26 of the flange 10 of the needle roller bushing 22 engages. In this way, again an inseparable assembly is formed that is advantageously sealed by the inventive arrangement.

Figure 6:
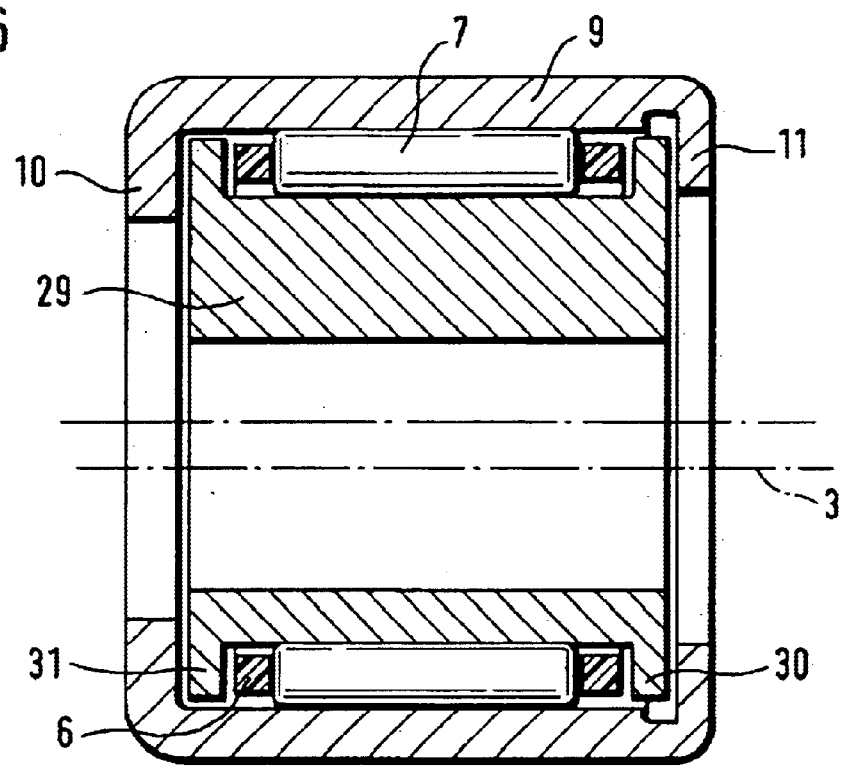
FIG. 6 shows still another embodiment of the eccentric bearing of the invention.

The eccentric bearing shown in FIG. 6 comprises the eccentric ring 29 which. according to a further proposition of the invention, comprises on each of its two opposite ends, a radially outward directed extension 30 and 31 respectively, which extensions are surrounded by the flanges 11 and 10 of the needle roller bushing 9. The needle roller crown ring comprising the needle rollers 7 and the cage 6 is arranged between the two radial extensions 30 and 31.

Figure 7:
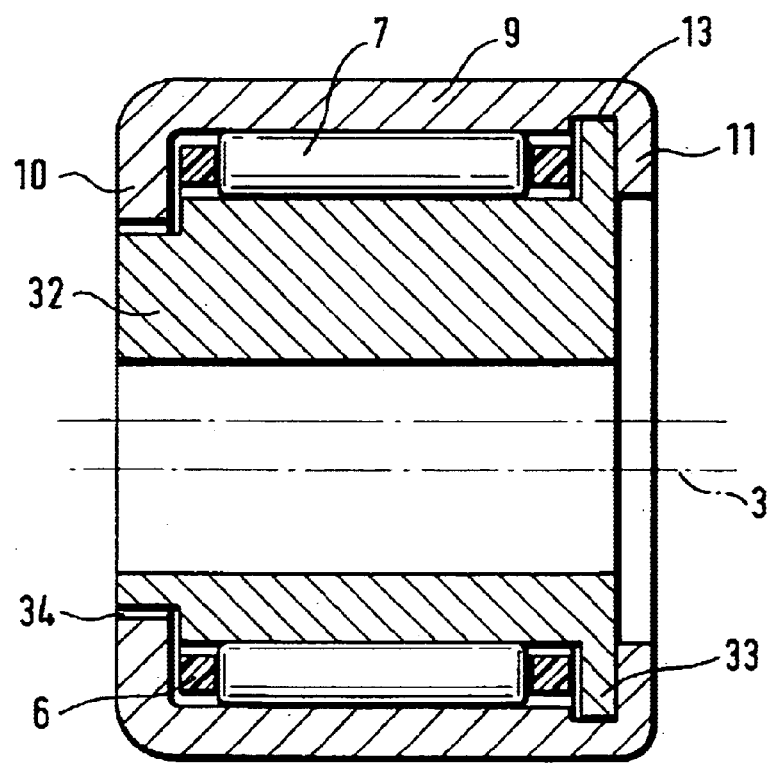
FIG. 7 shows still another embodiment of the eccentric bearing of the invention.

The needle roller bushing 9 represented in FIG. 7 is distinguished by the fact that the radially outward directed extension 33 of the eccentric ring 32 is guided in the circumferential groove 13 for free rotation. On the opposite end, the eccentric ring 32 comprises a stepped recess 34 into which this flange 10 of the needle roller bushing 9 engages, so that, in this case, too, an efficient sealing of the eccentric bearing arrangement is realized.

What is claimed is:

1. A radial piston pump comprising a rotating pump shaft having a portion that is fixedly attached to an eccentric ring, a needle roller bearing being arranged on an outer peripheral surface of the eccentric ring, said needle roller bearing comprising a needle roller bushing having two radially inward directed flanges between which needle rollers are guided in a cage roll, an outer raceway for the needle rollers being formed by an inner peripheral surface of the needle roller bushing and an inner raceway for the needle rollers being formed by the outer peripheral surface of the eccentric ring, a stop washer being arranged on one side between one of the flanges of the needle roller bushing and the eccentric ring, said stop washer overlapping the eccentric ring radially, so that an inseparable assembly is formed, and at least one pump plunger that is arranged in a pump housing and extends radially to the pump shaft being supported through an end face on the needle roller bushing, wherein the stop washer is retained in a circumferential groove of the needle roller bushing and is surrounded radially by an adjacent one of the flanges of the needle roller bushing, and said stop washer comprises an axially inward open annular groove in which the cage is guided.

2. A needle roller bearing of claim 1, wherein the stop washer is arranged for free rotation in the needle roller bushing.

3. A needle roller bearing of claim 1, wherein the stop washer is firmly fixed in the needle roller bushing.

4. A needle roller bearing of claim 1, wherein that flange of the needle roller bushing that is situated opposite the stop washer comprises an axially inward open annular groove in which the cage is guided.

5. A needle roller bearing of claim 4, wherein, as viewed in a longitudinal cross-section, the cage has a reduced radial thickness in a region of the annular grooves.

6. A radial piston pump comprising a rotating pump shaft having a portion that is fixedly attached to an eccentric ring, a needle roller bearing being arranged on an outer peripheral surface of the eccentric ring, said needle roller bearing comprising a needle roller bushing having two radially inward directed flanges between which needle rollers are guided in a cage roll, an outer raceway for the needle rollers being formed by an inner peripheral surface of the needle roller bushing and an inner raceway for the needle rollers being formed by the outer peripheral surface of the eccentric ring, a stop washer being arranged on one side between one of the flanges of the needle roller bushing and the eccentric ring, said stop washer overlapping the eccentric ring radially, so that an inseparable assembly is formed, and at least one pump plunger that is arranged in a pump housing and extends radially to the pump shaft being supported through an end face on the needle roller bushing, wherein each of two ends of the eccentric ring comprises a stepped recess into which the stop washer and the flange that is situated opposite the stop washer engage.

7. A radial piston pump comprising a rotating pump shaft having a portion that is fixedly attached to an eccentric ring, a needle roller bearing being arranged on an outer peripheral surface of the eccentric ring, said needle roller bearing comprising a needle roller bushing having two radially inward directed flanges between which needle rollers are guided in a cage roll, an outer raceway for the needle rollers being formed by an inner peripheral surface of the needle roller bushing and an inner raceway for the needle rollers being formed by the outer peripheral surface of the eccentric ring, a stop washer being arranged on one side between one of the flanges of the needle roller bushing and the eccentric ring, said stop washer overlapping the eccentric ring radially, so that an inseparable assembly is formed and at least one pump plunger that is arranged in a pump housing and extends radially to the pump shaft being supported through an end face on the needle roller bushing, wherein the stop washer is retained in a circumferential groove of the needle roller bushing and is surrounded radially by an adjacent one of the flanges of the needle roller bushing, a sliding seal being arranged between the cage and the stop washer and between the cage and an opposite one of the flanges.

8. A radial piston pump comprising a rotating pump shaft having a portion that is fixedly attached to an eccentric ring, a needle roller bearing being arranged on an outer peripheral surface of the eccentric ring, said needle roller bearing comprising a needle roller bushing having two radially inward directed flanges between which needle rollers are guided in a cage roll, an outer raceway for the needle rollers being formed by an inner peripheral surface of the needle roller bushing and an inner raceway for the needle rollers being formed by the outer peripheral surface of the eccentric ring, a stop washer being arranged on one side between one of the flanges of the needle roller bushing and the eccentric ring, said stop washer overlapping the eccentric ring radially, so that an inseparable assembly is formed, and at least one pump plunger that is arranged in a pump housing and extends radially to the pump shaft being supported through an end face on the needle roller bushing, wherein the stop washer is retained in a circumferential groove of the needle roller bushing and is surrounded radially by an adjacent one of the flanges of the needle roller bushing, which flange engages through an axial extension into an axially outward open annular groove of the stop washer, and that end of the eccentric ring that is situated opposite the stop washer comprises an axially outward open annular groove into which an axial extension of the other of the two flanges engages.

9. A radial piston pump comprising a rotating pump shaft having a portion that is fixedly attached to an eccentric ring, a needle roller bearing being arranged on an outer peripheral surface of the eccentric ring, said needle roller bearing comprising a needle roller bushing having two radially inward directed flanges between which needle rollers are guided in a cage roll, so that an inseparable assembly is formed an outer raceway for the needle rollers being formed by an inner peripheral surface of the needle roller bushing and an inner raceway for the needle rollers being formed by the outer peripheral surface of the eccentric ring, wherein, adjoining the inner raceway for the needle rollers, the eccentric ring comprises on a first and a second end, a radially outward directed extension, and each extension is surrounded by one of the flanges of the needle roller bushing.

10. A radial piston pump comprising a rotating pump shaft having a portion that is fixedly attached to an eccentric ring is, a needle roller bearing being arranged on an outer peripheral surface of the eccentric ring, said needle roller bearing comprising a needle roller bushing having two radially inward directed flanges between which needle rollers are guided in a cage roll, so that an inseparable assembly is formed, an outer raceway for the needle rollers being formed by an inner peripheral surface of the needle roller bushing and an inner raceway for the needle rollers being formed by the outer peripheral surface of the eccentric ring, wherein, adjoining the inner raceway for the needle rollers, the eccentric ring comprises on one end, a radially outward directed extension that is surrounded by one of the flanges of the needle roller bushing, while on an opposite end, the eccentric ring comprises a stepped recess into which the other of the flanges of the needle roller bushing engages.

* * * * *